(12) United States Patent
Rakuljic et al.

(10) Patent No.: US 6,445,851 B1
(45) Date of Patent: Sep. 3, 2002

(54) TAPERED FIBER GRATINGS AND APPLICATIONS

(75) Inventors: George A. Rakuljic; Anthony S. Kewitsch, both of Santa Monica, CA (US)

(73) Assignee: Arroyo Optics Inc., Santa Monica, CA (US)

( * ) Notice: Subject to any disclaimer, the term of this patent is extended or adjusted under 35 U.S.C. 154(b) by 0 days.

(21) Appl. No.: 09/461,013

(22) Filed: Dec. 15, 1999

Related U.S. Application Data (60) Provisional application No. 60/112,281, filed on Dec. 15, 1998.

(51) Int. Cl.[7] ................................................. G02B 6/34
(52) U.S. Cl. ............................. 385/37; 385/31; 385/15; 385/123
(58) Field of Search ........................... 385/37, 31, 15, 385/27, 123

(56) References Cited

U.S. PATENT DOCUMENTS

| | | | |
|---|---|---|---|
| 5,805,751 A | | 9/1998 | Kewitch et al. |
| 5,818,987 A | * | 10/1998 | Bakhti et al. .................. 385/28 |
| 5,852,690 A | | 12/1998 | Haggans et al. |
| 5,875,272 A | | 2/1999 | Kewitch et al. |
| 5,883,990 A | | 3/1999 | Sasaoka et al. |
| 5,915,050 A | * | 6/1999 | Russell et al. .................. 385/7 |
| 5,995,691 A | * | 11/1999 | Arai et al. ...................... 385/37 |
| 6,181,840 B1 | * | 1/2001 | Huang et al. .................. 385/10 |

FOREIGN PATENT DOCUMENTS

WO    WO 99/00686    1/1999

OTHER PUBLICATIONS

Dong L. et al., Optical Fibers with Depressed Cladding for Suppression of Coupling Into Cladding Modes in Fiber Gragg Gratings, IEEE Photonics Tech. Letters, vol. 9, No. 1, Jan. 1997, pp 64–66.

Hewlett, S.J. et al., Cladding–mode Coupling Characteristics of Bragg Gratings in Depressed–Cladding Fibre, Electronics Letters, vol. 31, No. 10, 1995, pp. 820–822.

Xu M.G. et al., Temperature–independent strain sensor using a chirped Bragg grating in a tapered optical fibre, Electronics Letters, vol. 31, No. 10, 1995, pp. 823–825.

Mizrahi V. et al., Optical Properties of Photosensitive Fiber Phase Gratings, J. Lightwave Tech., vol. 11, No. 11, Oct. 93, pp 1513–1517.

Hill, K. O. et al., Photosensitivity in Optical Fibers, Ann. Rev. Mater Sci. 1993, pp. 125–157.

Alegria C. et al., Acousto–optic filters based on multi–tapered fibre structures, Electronics Letters, vol. 35, No. 12, Dec. 1999, pp. 1006–1007.

Putnam, M.A. et al., Fabrication of tapered, strain–gradient chirped fibre Bragg gratings, Electronics Letters, vol. 31, No. 4, Feb. 1995, pp. 309–310.

* cited by examiner

*Primary Examiner*—Hemang Sanghavi
*Assistant Examiner*—Sung Pak
(74) *Attorney, Agent, or Firm*—Jones, Tullar & Cooper, P.C.

(57) ABSTRACT

Optical filter devices in accordance with the invention are based on tapered optical fibers having transversely distributed refractive index variations in a small diameter waist region where waves are propagated in combined cladding/air-guided modes. The grating has a periodicity selected for reflection of a selected center wavelength and the waist diameter and grating pattern split the wavelengths of the lossy cladding modes from the backreflected signals by more than 10 nm. Such wavelength selective optical fiber devices have a variety of applications. In one application, a tapered fiber grating with optical circulators is used to add or drop optical signals for communication via a common transmission path. In another application, the tapered fiber grating is used with grating assisted mode couplers and circulators to form an add/drop multiplexer. In another application, these components are used with optical switches to produce programmable add/drop filters and crossconnects.

8 Claims, 7 Drawing Sheets

Wavelength (nm)

TAPERED FIBER GRATINGS AND APPLICATIONS

This application claims the benefit of U.S. Provisional Application No. 60/112,281, filed Dec. 15, 1998, the disclosure of which is hereby incorporated herein by reference.

FIELD OF THE INVENTION

The present invention relates to the communication of signals via optical fibers, particularly to tapered optical fibers and couplers. More particularly, the invention relates to wavelength selective tapered fiber gratings, add/drop filters and optical circuits for wavelength division multiplexed systems.

DESCRIPTION OF RELATED ART

Low loss, wavelength selective filters are important components for optical fiber communication networks based on wavelength division multiplexing (WDM). WDM enables an individual optical fiber to transmit several or many channels simultaneously, at different spaced apart center wavelengths. As the art has developed, standardized wavelength band parameters have been set, for the number of channels, the total wavelength band, and the separation between channels. As a basic example, 30 nm may be devoted to a band of 4 channels having 10 nm separations between the center wavelengths.

Transmission of multiplexed signals without intervening wavelength signals or interference between them is complicated by the need for low loss both above and below the selected center wavelengths. In-fiber (e.g., erbium) amplifiers have a relatively wide window (e.g., 35 nm) and unwanted off-wavelength signals affect network reliability. Optical wave energy interacts with active and passive components which can have an adverse effect on insertion loss and signal attenuation, as well as introducing undesired backreflection. Devices such as fiber Bragg gratings are widely used in WDM systems. Most of such filters are used in a reflection mode, which provides higher wavelength selectivity than transmission mode, and write a Bragg grating in the core of the fiber (dopant in the core enables photosensitization and subsequent grating recording). Some of these filters, and also couplers made by fusing two fibers along a short length, are tapered to a reduced diameter waist. Whether tapered or not, the reflected wavelength, which is typically called a drop wavelength, is accompanied by signals of shorter wavelength that arise from lossy cladding modes.

In prior art fiber gratings, the grating periodicity written in the core has only limited transverse width, and the grating components couple light into lossy cladding modes which have only small wavelength separations from the reflected wavelength. The fact that the single mode optical fibers have low numerical aperture (ca 0.12) contributes to this condition. Heretofore the separation has been no greater than 10 nm, on the short wavelength side of the Bragg wavelength. This places a limitation on the placement of the signals and channels which can pass through a fiber grating. Tapered devices reduce the dopant core to a vestigial size and function, and so do not usefully employ Bragg gratings. As a consequence, index of refraction gratings have heretofore been recorded only in the core of the optical fiber, a volume of less than 1% of the total fiber. The presence of a taper dramatically reduces diffraction efficiency, typically to less than 1%, and the problems arising from the limited splitting of lossy modes from backreflected wavelengths still remain.

The splitting problem also exists in most fused couplers which are grating assisted, because light is largely confined in the original cores and overlaps only at the evanescent tails of the optical modes It is now known, however, as described in U.S. Pat. No. 5,805,751 (assigned to the assignee of the present invention), that these disadvantages can be overcome in a fused coupler using novel concepts. A fused, small diameter, waist is formed by merging two elongated fibers along a short length. The fibers are tapered to the waist sufficiently slowly, in adiabatic fashion, for light to evolve into a single local supermode at the waist. In this merged waist the optical mode propagation characteristics are effectively those of a multimode silica core/air cladding waveguide, the original core having diminished to a non-functional diameter in terms of wave confinement. The index of refraction grating couples to propagated waves with much increased diffraction efficiency, and the numerical aperture of the waveguide is much higher. Also modal propagation constants can be maintained at higher differentials than conventional fused couplers, so the difference between backreflected and back coupled lossy cladding mode light can also be higher. Even here, however, relaxation of design requirements is desirable in terms of cost and yield.

Obtaining comparable splitting properties, along with high coupling strength, in a tapered fiber grating has remained a desirable goal for device and system designers. Because of the need to avoid cumulative insertion losses and the restraints imposed by the presence of lossy wavelengths in close relation to dropped wavelengths, system configurations can be simplified or made more efficient if these limitations can be overcome.

GLOSSARY

A "waveguide" herein is an elongated structure comprised of an optical guiding region of relatively high refractive index transparent material (the core) surrounded by a material of lower refractive index (the cladding), the refractive indices being selected for transmitting an optical mode in the longitudinal direction.

An "optical fiber" herein is an elongated structure of nominally circular cross section comprised of a "core" of relatively high refractive index material surrounded by a "cladding" of lower refractive index material, adapted for transmitting an optical mode in the longitudinal direction.

An "air-clad" fiber is one in which the original core is too small to be effective and in which transmission is confined by the reduced original cladding and the surrounding environment (typically air).

A "lossy mode" is any of the higher order optical modes that exist within the waist region of the tapered fiber, wherein optical propagation is dictated by the air-glass waveguide. Power in these optical modes is lost as they propagate through the taper into the single mode core of the original fiber, hence they are lossy.

A "grating" herein is a region wherein the refractive index varies as a function of distance in the medium. The variation typically, but not necessarily, is such that the distance between adjacent index maxima is constant.

A "tapered doped-cladding fiber grating" is photosensitive cladding optical fiber that is elongated in a central region so that propagation characteristics in the central region are dictated by air-glass propagation and wherein a grating is present in the central region.

The "bandwidth" of a grating is the wavelength separation between those two points for which the reflectivity of grating is 50% of the peak reflectivity of the grating.

A "waist" herein refers to that portion of an elongated structure with minimum circumference.

A "transversely symmetric" grating is an index of refraction grating in which the index variation as a function of distance from the central axis of the waveguide along a direction perpendicular to the longitudinal axis is identical to the index variation in the opposite direction, perpendicular to the longitudinal axis. A transversely symmetric grating possesses grating vector components at a zero degree angle to the longitudinal axis or mode propagation direction of the waveguide. Orthogonal modes are not efficiently coupled by a transversely symmetric grating.

A "supermode" is the optical eigenmode of the complete, composite waveguide structure.

SUMMARY OF THE INVENTION

A high diffraction efficiency optical fiber device in accordance with the invention utilizes a grating distributed within a doped cladding portion of tapered section, to separate a desired optical wavelength from other wavelengths and from lossy modes as well. This enables a number of optical circuits to be developed which utilize such devices to advantage by nullifying some characteristics of other components.

More specifically, individual devices in accordance with the invention include a waist region of small diameter achieved by drawing down a conventional-size optical fiber to a very small diameter, such as less than 10 microns. The device incorporates a substantial radial distribution of dopant extending out from the central core, and a grating of selected periodicity, the refractivity variations in which are transversely distributed through the dopant volume, to be in excess of 20% of the cross-sectional fiber area at the waist. The periodicity is selected such that signals of a chosen wavelength are reflected (the grating being bidirectional) with high diffraction efficiency. At the same time, the diameter of the waist region is chosen to increase the difference (splitting) between the reflected (or drop) wavelength and lossy cladding mode wavelengths. Thus the latter are shorter than the center backreflected wavelength by greater than 10 nm and for sufficiently small waist diameters (<1 um) they disappear completely.

Using the tapered doped cladding fiber grating with signals received from a source through a circulator, the chosen center wavelength is dropped to a detector back through the circulator, as other wavelengths outside the bandwidth of the filter pass through it to a different detector. In a specific example of such a device, the diameter of the waist region is in the range of 1–4 microns, the core-cladding index difference is approximately 0.45 and the dopant-rich cladding is in excess of about 50% of the cross-sectional area of the tapered waist.

In consequence of this improved splitting function system configurations are released from a number of design limitations. In-fiber amplifiers with wider bandwidths than the filters can be employed with greater freedom from wavelength restrictions. Other devices, such as wavelength selective couplers, can be designed to less strict tolerances if they are set to the same wavelength as the fiber grating and receive a signal from or send a signal to it. Systems in accordance with the invention may employ sequences of tapered doped cladding fiber gratings, each responsive to a different wavelength, in conjunction with sequences of wavelength responsive couplers set at the same wavelengths. By using the bidirectional reflective characteristics of the gratings and the reflective characteristics of the couplers, channels in a wavelength division multiplexed band can be added and dropped with lossy cladding modes in effect being nullified by the tapered fiber gratings. Adding and dropping of channels can be determined by the wavelengths that are present in the signal, and additionally by programming control using switches incorporated in the system.

In one example of an optical circuit, a bypass loop about a series of tapered doped cladding fiber gratings is formed by circulators at each end, forming the terminals of a bypass loop in which four port add/drop couplers are disposed that respond to wavelengths like those in the fiber gratings. Signals to be dropped reflect from the fiber gratings into the bypass loop, while signals to be add reflect off the couplers into a forward direction in the bypass loop, then via a circulator into the reverse transmission direction before being reflected as output off the appropriate fiber grating. This system is made programmable by the incorporation of switches in the bypass loop, together with shunt paths for the couplers.

In a different arrangement in accordance with the inventions, an optical signal router is provided by using a series of switches on a throughput line, and shunting successive pairs of switches with bidirectional tapered doped cladding fiber gratings. Circulators at each end of the switch series enable signals on the throughput line to be added or dropped at selected wavelengths in programmed fashion.

In other basic configurations, a circulator on a throughput line incorporating a series of tapered doped cladding fibers is coupled to another optical line which includes a number of add or drop couplers. Signals at wavelengths to be added to the throughput line are reflected to the circulator and back to the appropriate tapered fiber for redirection along the throughput line. Where signals are to be dropped they are reflected first off the appropriate tapered fiber and back through a circulator to the coupler sequence.

BRIEF DESCRIPTION OF THE DRAWINGS

A better understanding of the invention may be had by reference to the following description, taken in conjunction with the accompanying drawings, in which.

DETAILED DESCRIPTION OF A PREFERRED EMBODIMENT

Optical fibers carry signals in the form of modulated light waves from a source of data, the transmitter, to a recipient of data, the receiver. Once light enters this fiber, it travels in isolation unless an optical coupler is inserted at some location along the fiber. Optical couplers allow light signals to be transferred between normally independent fibers. If multiple signals at different wavelengths travel down the same fiber, it is desirable to reflect a signal at only a predetermined set of wavelengths within this fiber. A desirable attribute of such a tapered fiber grating is that it remains transparent to all wavelengths other than those to be back-reflected. That is, it should exhibit no excess loss.

Figure 1:
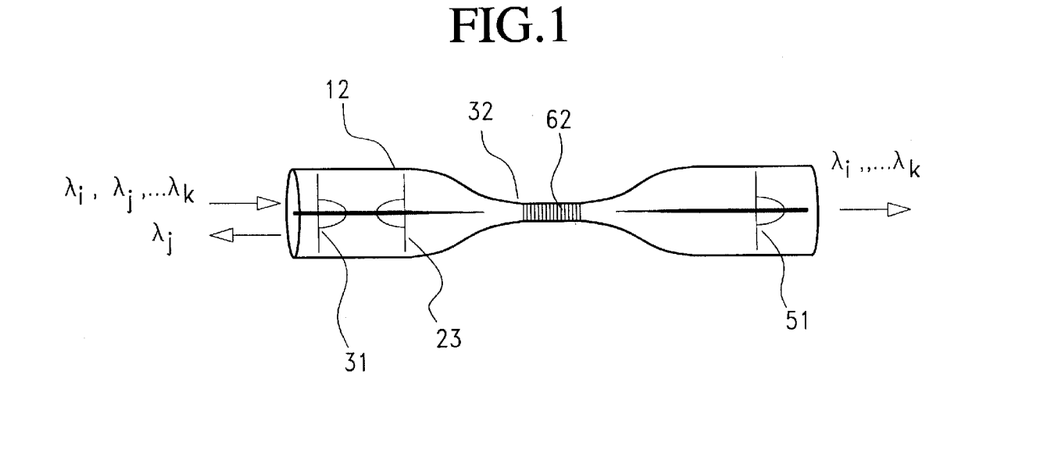
FIG. 1 is an idealized and somewhat simplified representation of a tapered fiber grating in accordance with the invention.

FIG. 1 illustrates the structure of this device. The tapered doped-cladding fiber grating consists of a fiber 12 tapered to form a waist region 32 wherein an index of refraction grating has been impressed. If the input mode 31 with propagation vector $\beta_1$ and output mode 23 with propagation vector $-\beta_1$ satisfy the Bragg law for reflection from a thick index grating of period $\Lambda_g$ at a particular wavelength, say $\lambda_i$:

$$2\beta_1(\lambda_i)=2\pi/\Lambda_g,$$

then the optical energy at $\lambda_i$ in the fiber 12 is coupled into the backward propagating mode of the same fiber. The spectral response and efficiency of this coupling process is dictated by the coupling strength and the interaction length of the optical modes with the grating.

In FIG. 1, the wavelength of the input mode is detuned, say to $\lambda_j$, so that $2\beta_1(\lambda_j)\neq 2\pi/\Lambda_g$, and the input mode 31 in the fiber travels through the taper waist and reappears as the output mode of the first fiber 51, with minimal loss. Therefore, only a particular wavelength $\lambda_i$ is backreflected, as determined by the grating period in the coupling region. The amount of wavelength detuning required to reduce the reflective coupling by 50% is given by the full-width-half-maxima (FWHM) bandwidth $\Delta\lambda$ of the grating:

$$\Delta\lambda \approx \frac{\Lambda_g \lambda_o}{L_{eff}},$$

where $L_{eff}$ is the effective interaction length of the optical beam and the grating, which may be less than the physical length L of the grating for large $\kappa$. The bandwidth of reflection gratings is narrower than that of transmission gratings by typically ten to fifty times because the grating period $\Lambda_g$ is much shorter for the former. The high wavelength selectivity in the reflection mode is desirable for dense WDM applications. Typically, the desired bandpass is approximately 0.5 nm at 1.55 $\mu$m. This dictates that the length of the reflection grating should be approximately 1 mm. A reflectivity in excess of 90% for a grating thickness L of 1 mm requires a $\kappa$L larger than 2.$\kappa$ should then be 20 cm$^{-1}$. To achieve this coupling strength in the fused coupler, the grating index modulation should be approximately 10$^{-3}$. This level of index modulation is achieved in silica waveguides and optical fibers by appropriate preparation of the materials and dimensions of the media. Typically the length L is approximately 5 mm and the coupling factor $\kappa$ is equal to or greater than 4 cm$^{-1}$.

In addition to backward coupling of light into the waveguide, the grating typically reflects some light back into the original fiber at higher order waist modes with propagation vectors $\beta_j(\lambda_j)$ at different wavelengths given by $\beta_1(\lambda_j)-\beta_j(\lambda_j)=k_g$. To ensure that $\lambda_j$ is outside the wavelength operating range of interest, the difference between $\beta_1$ and $\beta_j$ is made sufficiently large. The difference increases as the waveguide becomes more strongly tapered, until the limiting case is reached, in which the diameter of the air-glass waveguide of the taper waist is reduced such that all higher order modes are cutoff at the wavelength range of interest.

To form this fiber optic taper, a fiber is elongated in a central region under a heat source to form a narrow waist typically 1 to 4 microns in diameter, forming a multimode waveguide with a large core-cladding index difference (~0.45) in the tapered region. The number of modes supported by this waveguide structure is determined by the index profile and dimensions of the structure. When this composite waveguide structure is significantly reduced in diameter, the waveguiding characteristics resemble that of a glass core/air clad waveguide. The mode propagation behavior of this simple step index waveguide is then characterized by a parameter defined as the V number, which decreases as the radius a of the waveguide core is decreased, and depends on the optical wavelength $\lambda$ of the mode, the core index $n_{core}$ and the cladding index $n_{clad}$:

$$V = \frac{2\pi a}{\lambda}\sqrt{n_{core}^2 - n_{clad}^2} = \frac{2\pi a}{\lambda}N.A..$$

N.A. is defined as the numerical aperture of the waveguide.

Figure 2A:
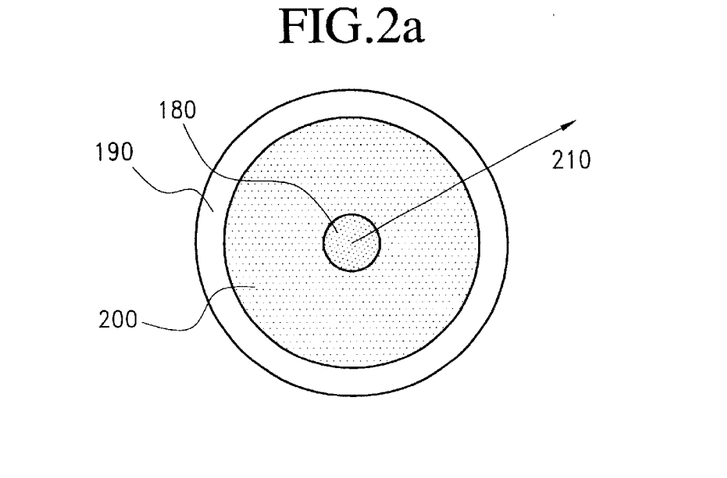
FIG. 2 is a pair of idealized sectional views, FIGS. 2a and 2b, of dopant distributions in the waist of a tapered fiber grating, including extensive distribution (FIG. 2a) and more limited distribution (FIG. 2b)
Figure 2B:
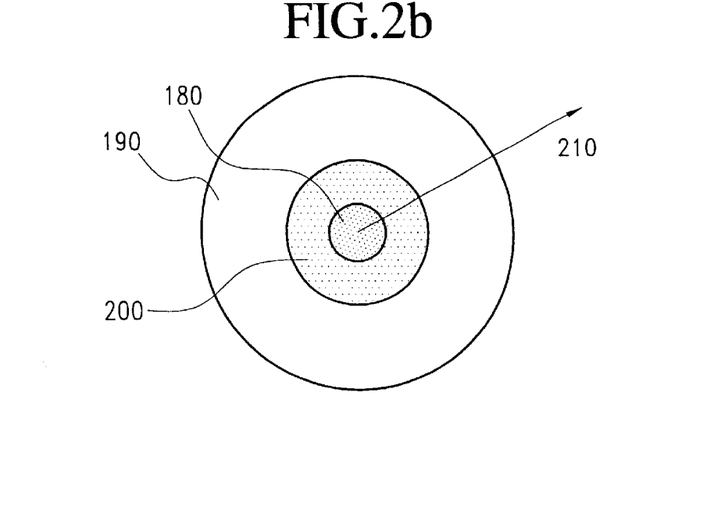

To imprint a strong index of refraction grating 62 within the taper waist 32 requires that a significant volume fraction of the cladding be doped (FIG. 2). The farther the dopant 200 (e.g., Ge) extends out along the radius of the fiber 210, the more photosensitive the resulting taper waist will be after the fusion and elongation stages. The cross section depicted in FIG. 2a is expected to exhibit greater photosensitivity than the cross section depicted in FIG. 2b, given equal dopant concentration levels, as a larger volume fraction of the cladding is doped.

A suitable starting fiber with a photosensitive cladding may be manufactured using known fabrication processes by doping the cladding region at least partially with a photosensitive species while preserving the single mode waveguiding properties (i.e., the N.A.) of a standard Corning SMF-28 fiber. For instance, by using the inside-the-tube vapor deposition process, a Ge doped cladding (about 3–20 wt %) and a more highly Ge doped core (about 6–23 wt %) can be built up within a thin walled pure silica tube which is thinned by etching or grinding following preform collapse. In conventional optical fiber fabrication, the outer pure silica tube comprises the bulk of the optical fiber cladding after sintering, collapsing and drawing, so that only a thin layer of Ge doped silica which defines the core is deposited. However, to form a photosensitive cladding of substantial thickness, multiple layers of Ge doped silica are deposited on the inside of the silica tube prior to forming the core to construct the photosensitive cladding, since tubes of Ge doped silica are not readily available. This preform precursor can then be used to form photosensitive cladding optical fiber by collapsing and drawing down the resulting preform using conventional fiber fabrication methods.

The index modulation of the photosensitive coupling region and its sensitivity to actinic radiation are enhanced if the taper is subjected to an environment of hydrogen or deuterium gas. In the prior art, hydrogen must first penetrate the 125 micron diameter, photoinsensitive silica cladding before diffusing into the nominally 8.5 micron diameter Ge-doped, photosensitive silica core. The present process is substantially different. First, we reduce the pressure, temperature, and time required to in-diffuse molecular hydrogen and/or deuterium into the silica by manufacturing a fiber in which the cladding of the fiber is photosensitive, thereby eliminating the large non-photosensitive barrier to indiffusion. Second, the time for the $H_2$ concentration to reach equilibrium within the center of a silica waveguide is reduced significantly by a factor $\chi$ in the tapered waist, where $\chi$ is defined as:

$$\chi = \left(\frac{d_{waist}}{d_{fiber}}\right)^2.$$

$d_{waist}$ is the diameter of the waist and $d_{fiber}$ is the original diameter of the fiber. Therefore, the time to treat the tapered coupler waist can be $10^{-4}$ times smaller than the time to treat a standard optical fiber. In the present method of fabrication based on elongating fibers, hydrogen photosensitization can be achieved automatically by using an oxygen-hydrogen torch. Alternately, the taper can be exposed within a high pressure deuterium or hydrogen gas environment to allow continuous indiffusion of gas into the silica glass during the exposure. Exposing under high average power heats the taper waist, further enhancing the rate of deuterium indiffusion.

OPERATION

The tapered doped-cladding fiber grating redirects optical energy (FIG. 3) that ia propagating in an optical fiber 108 from a source 104 which is connected to the taper 122 through a circulator 45. The period of the indexgrating formed within the taper is chosen to backreflect only that optical energy within a particular wavelength band toward the input fiber 108. Because a three port fiberoptic circulator 45 precedes the tapered fiber grating, the backreflected wavelengths travel to detector 106 through the fiber connector 114, rather than detector 110. All other wavelengths propagate through the coupler, circulator 47 and fiber connector 109 to detector 110, but not detector 106. This device is optimally fabricated by tapering photosensitive cladding optical fibers. The diffraction efficiency of a reflection grating asymptotically approaches 100% in contrast to the periodic oscillations in diffraction efficiency for a transmission grating. Therefore, a device based on reflection gratings is more robust with respect to grating decay and changes in the interaction length than an embodiment based on transmission gratings. This relaxes the manufacturing tolerances for a reflection mode grating assisted mode coupler while also improving the bandpass characteristics.

EXAMPLE 1

Add/Drop Filter

Figure 3:
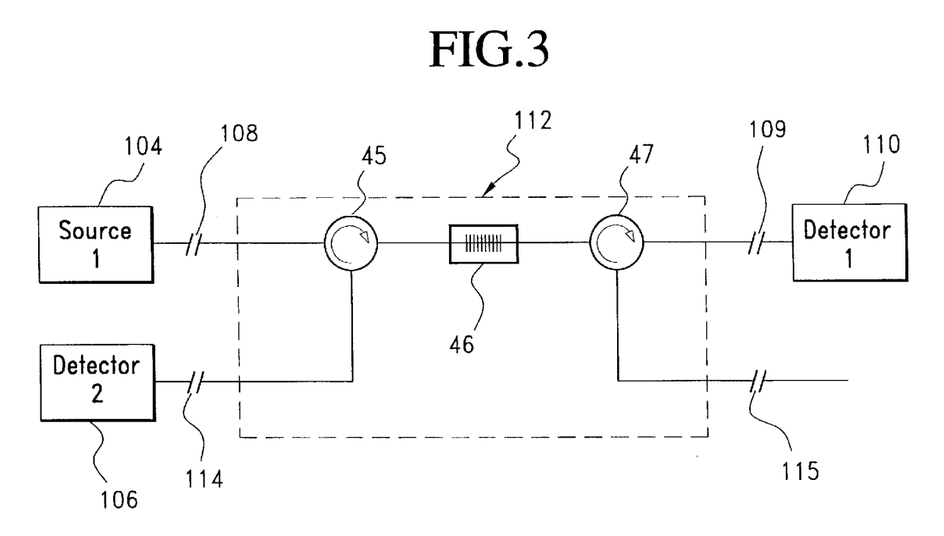
FIG. 3 is a schematic and block diagram view of an optical circuit employing the tapered fiber grating of FIG. 1.

A low insertion loss device to selectively add or drop an optical channel of a particular wavelength with high efficiency is a building block for WDM networks. A functional representation of this device based on a tapered fiber grating 46 and circulators 45, 47 is illustrated in FIG. 3. The input optical fiber 106 carries N channels of information, each channel at a different center wavelength $\lambda_j$. The tapered fiber grating 45 backreflects a particular channel $\lambda_j$. This backreflected channel is routed onto the first output optical fiber 114 by a fiberoptic circulator 45, while all other channels travel uninterrupted through the aforementioned taper region to the second output optical fiber 109.

This device can also operate as an add filter by adding a second circulator 47 along the second output optical fiber 109, and using fiber 115 as the add input. A particular channel $\lambda_j$ is added to a fiber containing channels at other wavelengths $\lambda_j$. The add and drop filters are passive devices operating only at one or more predefined wavelengths. The drop filter can simultaneously drop multiple channels by recording several gratings of predetermined periodicity within one or many tapered fibers. Similarly, the add filter can simultaneously add multiple channels by recording several gratings of predetermined periodicity within one or many tapered fibers.

EXAMPLE 2

Tapered Doped-Cladding Fiber Grating Fabrication

Figure 4:
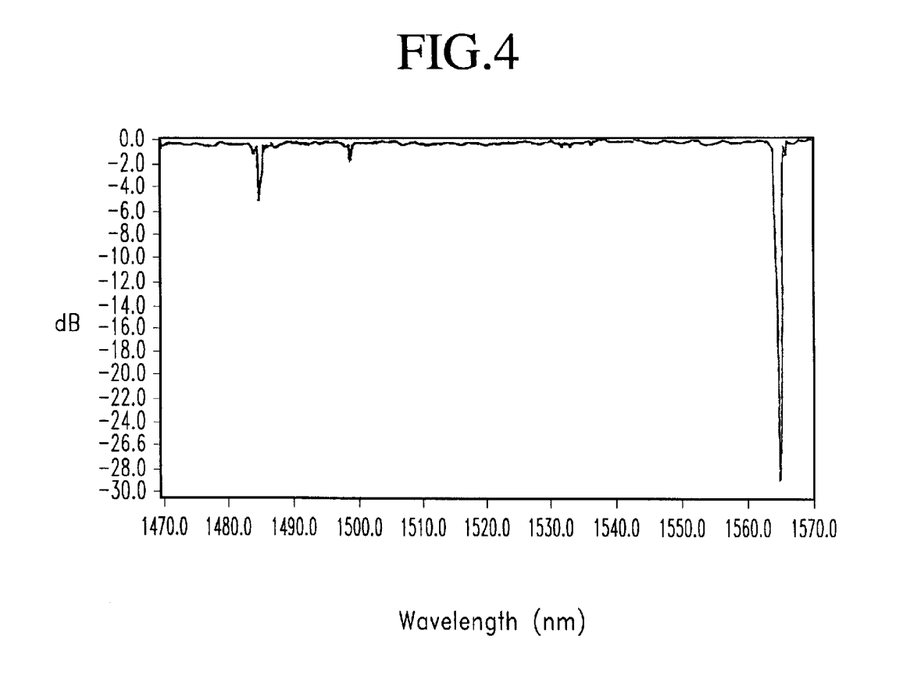
FIG. 4 is a diagram of signal variations with wavelength in a tapered fiber grating in accordance with the invention.

One optical fiber whose index profile is illustrated in FIG. 2a, where the doped portion of the cladding 200 extends out to a diameter of 82 um and the core 180 is 9 um, is tapered such that the diameter is reduced from 125 um to 3.2 um over a length of approximately 25 mm The tapering is accomplished by pulling on opposite ends of the optical fiber while heating the optical fiber with an oxygen-hydrogen torch. The taper waist is subsequently exposed to a UV interference pattern generated by illuminating a silica phase mask of period 1.1 um with a focused beam of 244 nm cw illumination. This produces an optical interference pattern with a period of approximately 0.5 um. The grating is recorded for 5–20 minutes within a high pressure deuterium gas environment. The elongated region of the taper is subsequently epoxied to a temperature compensated prepackage to provide mechanical strength. The wavelength trace of light backreflected is illustrated in FIG. 4. The center wavelength of the backwards coupled light is 1520 nm, and the full width half maximum of the reflectivity peak is approximately 1 nm. The separation of the backreflected wavelength from the lossy cladding mode wavelengths is greater than 27 nm. The lossy cladding modes exhibit less than 0.5 dB loss, and the backreflection strength is 40 dB.

Novel WDM subsystems can be fabricated using the unique properties of tapered fiber gratings and grating assisted mode couplers. For example, by combining tapered fiber gratings and grating assisted mode couplers with optical switches and fiberoptic circulators, static and reconfigurable add/drop filters and wavelength selective crossconnects may be fabricated.

The advantage of tapered fiber gratings over fiber gratings is the extended low loss spectral range of these devices on the short wavelength side of the backreflection response. Typical fiber gratings of the prior art have a 5–10 nm region below the backreflection wavelength that is low loss. Below this wavelength, light is coupled in a lossy fashion to cladding modes. For typical WDM systems with a spectral window in excess of 35 nm, this leads to undesirable loss when channels 5–10 nm above the shortest wavelength channel are added or dropped.

Figure 5:
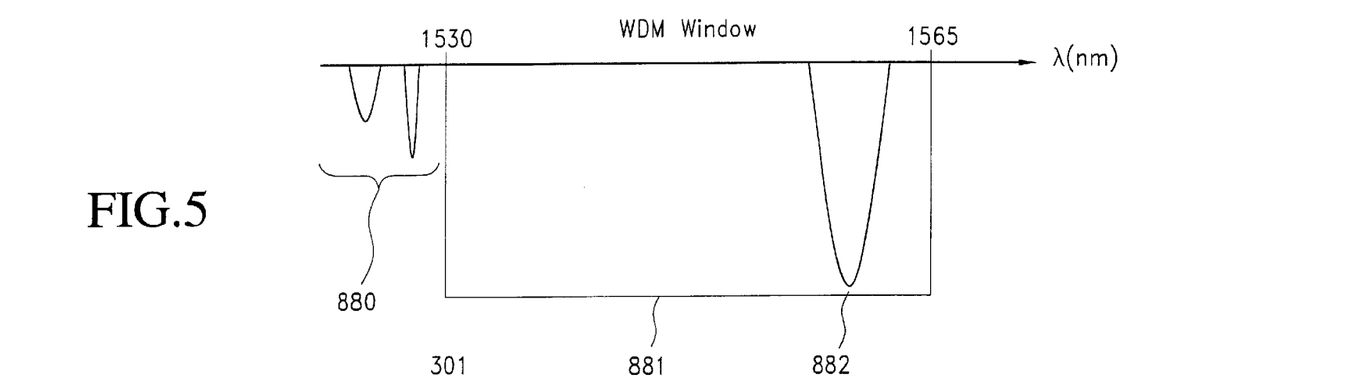
FIG. 5 is a graph of lossy modes and backreflected signal wavelength relationships to a wavelength band in a typical optical multiplexer.

To eliminate loss within the spectral window, the wavelength separation between the backreflection and lossy cladding modes must be in excess of the width of the spectral window (e.g., >35 nm). FIG. 5 illustrates lossy cladding modes 880 at a wavelength below the backreflection wavelength 882 and outside some wavelength window 881 (WDM c-band is illustrated here as an example). This can be achieved by increasing the numerical aperture of the waveguide in which the grating is recorded. Due to manufacturing limitations and the need to splice to standard single mode optical fiber with low loss, the numerical aperture of a typical fiber for fiber grating applications is less than 0.2. This limits the backreflection-lossy cladding mode wavelength separation.

To overcome this limitation, we expose not in a fiber but in the waist of a fiberoptic taper. By drawing down a fiber to a waist diameter of 2 to 3.5 microns, backreflection-cladding mode wavelength separations in excess of 30 nm can be produced. Usual photosensitive core fibers are not suitable for this process, because they do not have a cladding substantially doped with a photosensitive species such as Ge, B, Ta or Ce. This requirement is described in detail in U.S. Pat. No. 5,805,751. For a particular photosensitive cladding, we obtain the following separations between the backreflection and lossy cladding modes: 3.7 um diameter, 23 nm separation; 3.2 um diameter, 27 nm separation. For a tapered fiber grating, unlike a grating assisted mode coupler, the grating must be transversely symmetric. That is, the index of refraction grating is not tilted.

EXAMPLE 3

Four Channel Add-Drop Multiplexers

Figure 6:
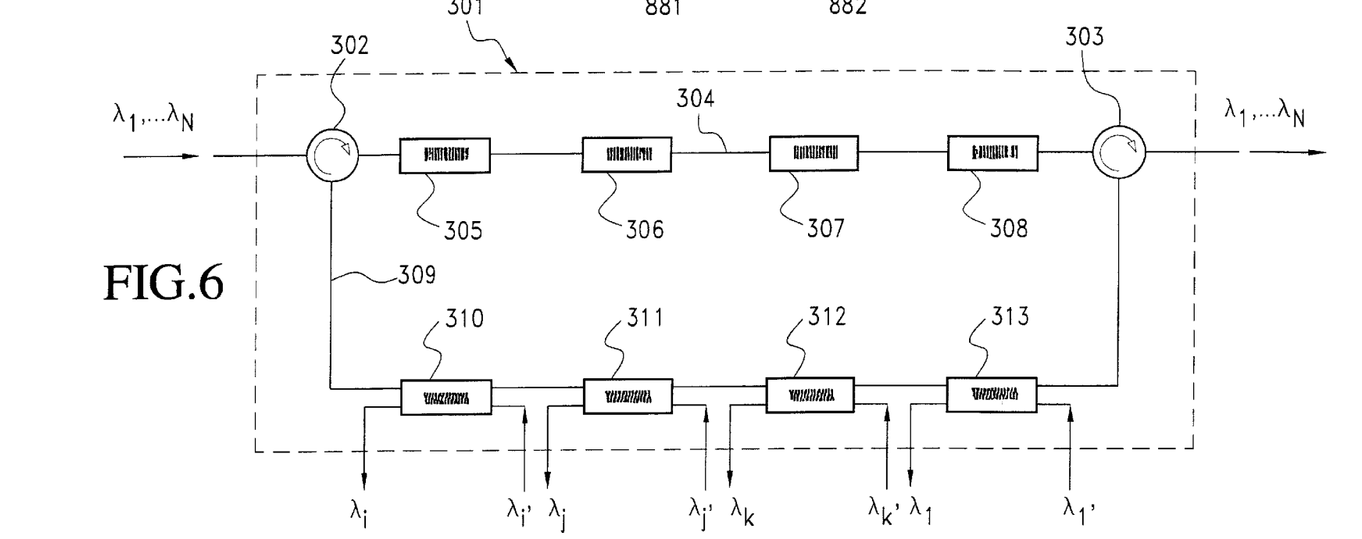
FIG. 6 is a block diagram of a static add/drop multiplexer achievable through the use of tapered fiber gratings.

A static 4 channel add/drop multiplexer 301 can be fabricated by inserting two three port circulators 302, 303 along a throughput line 304, with four tapered fiber gratings 305, 306, 307, 308 placed in series between the circulators (FIG. 6). These four tapered fiber gratings direct the four selected wavelength channels into the circulators, which direct the backreflected channels into the add/drop loop 309. Once in the add/drop loop, the individual channels are added and dropped by four grating assisted mode couplers 310, 311, 312, 313. The backreflection wavelengths $\lambda_i$, $\lambda_j$, $\lambda_k$, $\lambda_l$ of each tapered fiber grating 305, 306, 307, 308 is precisely matched to the drop wavelength of a corresponding grating assisted mode coupler 310, 311, 312, 313. Because of the limited spectral bandwidth traveling within the add/drop loop 309, the individual add/drop filters do not need to exhibit a drop-backreflection splitting equal to the full spectral bandwidth of the throughout fiber. This substantially relaxes the manufacturing tolerances on fabricating the grating assisted mode couplers. In essence, the large splitting function is relegated to the tapered fiber gratings, and the low loss add/drop routing function is relegated to the grating assisted mode couplers.

This embodiment has the advantage that four (in general, N) channels can be added and/or dropped with only two (in general, 2 three port and N–1 four port) circulators. The additional routing is performed by the low loss, grating assisted mode coupler. However, circulators typically have in excess of 0.5 dB loss per pass, so loss does not scale gracefully for large channel counts. By taking advantage first of the low loss of tapered fiber gratings and second of the low loss routing capability of the grating assisted mode coupler, an add/drop multiplexer of much higher performance is fabricated.

EXAMPLE 4

Programmable Add/Drop Multiplexer

Figure 7:
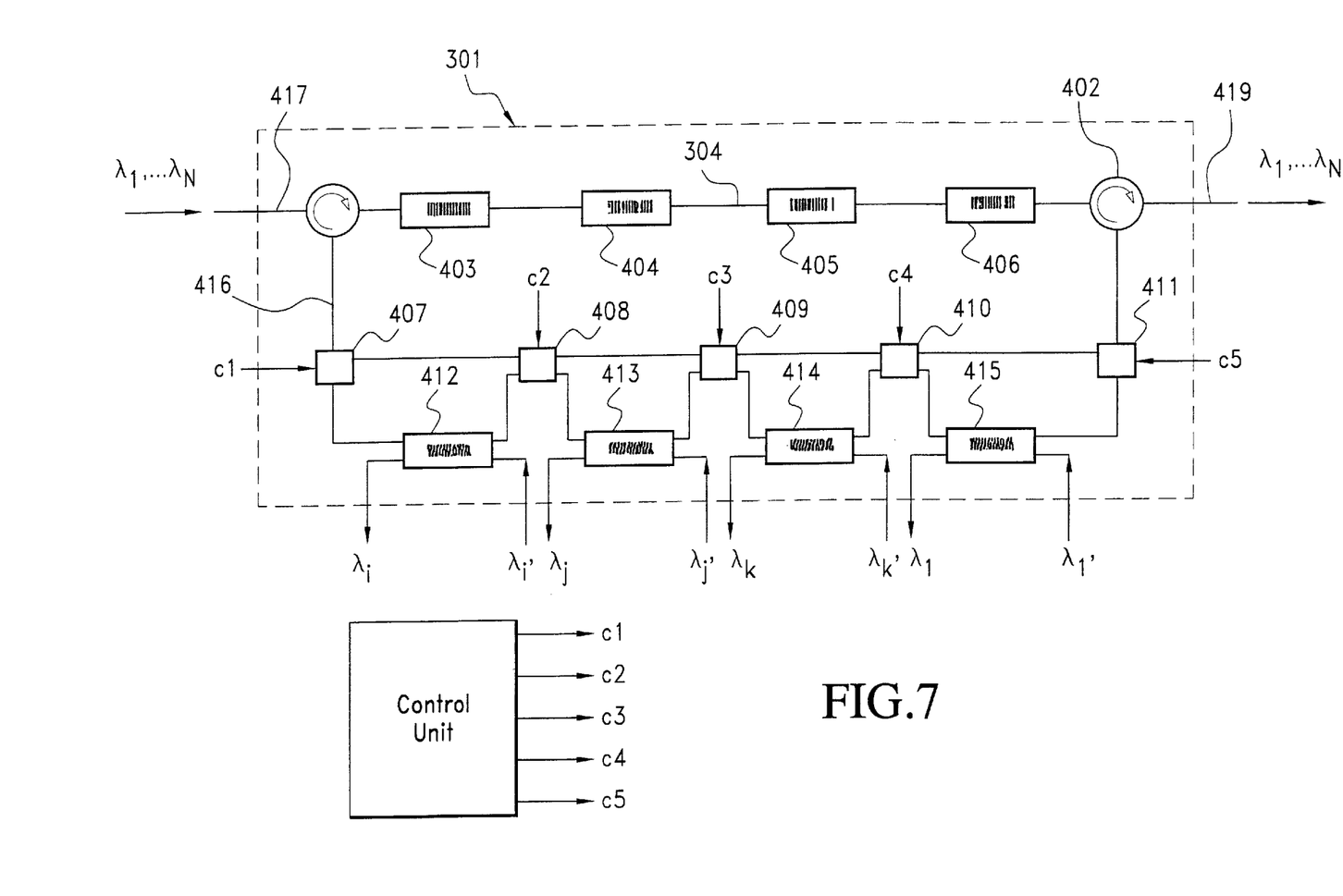
FIG. 7 is a block diagram of a programmable add/drop multiplexer using tapered fiber gratings in accordance with the invention.

Reconfigurable fiberoptic networks demand wavelength selective optical routers with the ability to dynamically route traffic at particular wavelengths from one fiber path to another and reconfigure the network within 10 ms. In one embodiment (FIG. 7), two three port circulators 401, 419 are placed along a throughput optical fiber 418, and between the circulators four tapered fiber gratings 403, 404, 405, 406 are arranged in parallel with two 1:2 switches 407, 411 and three 2:2 switches 408, 409, 410. The switches allow any combination of four preselected channels (determined by the Bragg wavelengths of individual tapered fiber gratings) to be routed onto individual grating assisted mode couplers 412, 413, 414, 415 with matching add/drop wavelengths. Depending on the switch states, the traffic either passes through the grating assisted mode coupler or bypasses it. Any of the four grating assisted mode couplers can be made active using this arrangement. This configuration requires that the tapered fiber gratings do not exhibit short wavelength loss over the entire spectral bandwidth transmitted over the throughput fiber. The spectral bandwidth of present WDM systems is typically 35 nm. A similar arrangement using standard fiber gratings would suffer from short wavelength loss due to grating coupling to lossy cladding modes. In addition, since only a subset of channels pass through the grating assisted mode couplers, the drop-backreflection wavelength splitting of this device can be made substantially smaller. This relaxes the manufacturing tolerances of these devices.

EXAMPLE 5

Programmable, Wavelength Selective Router

Figure 8:
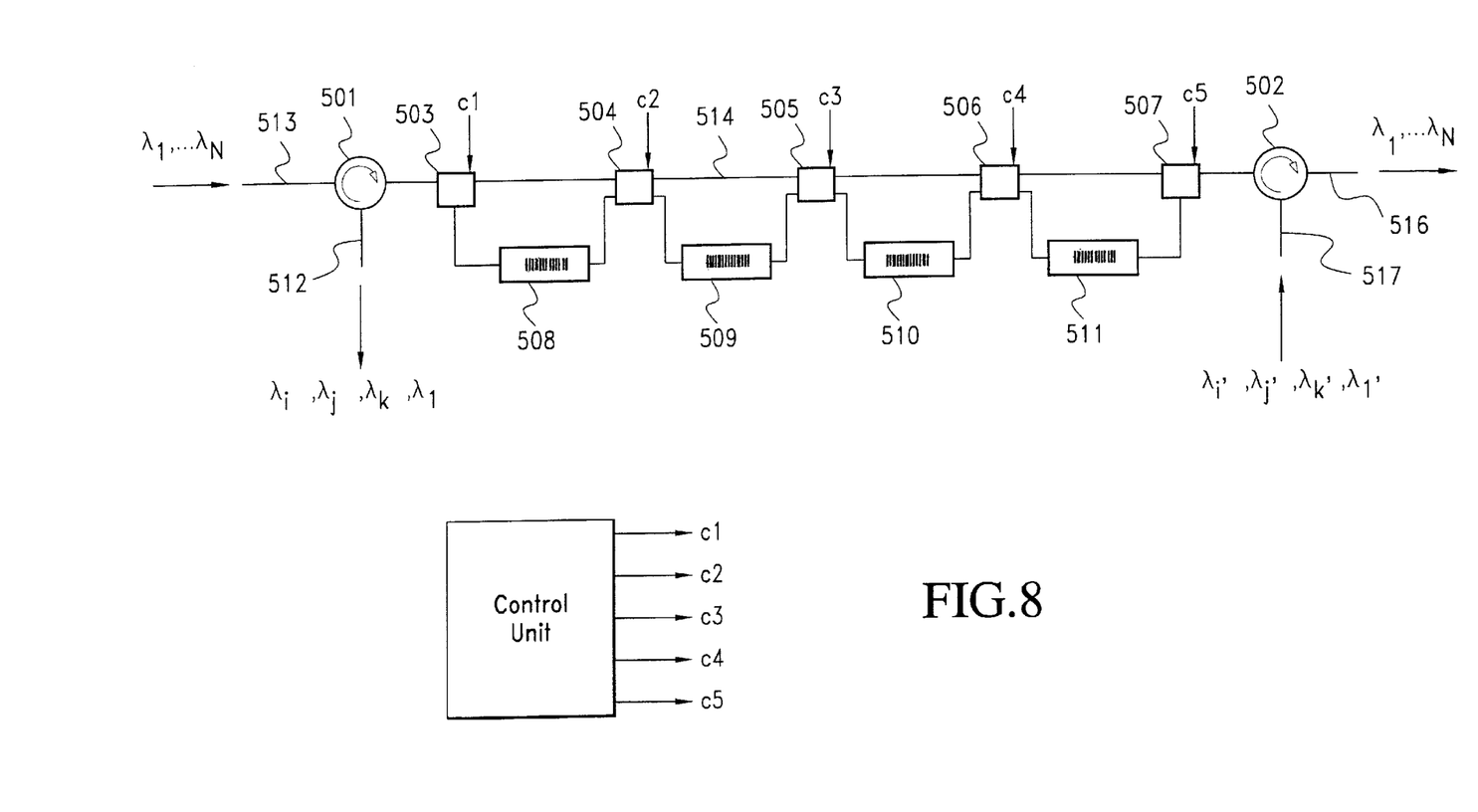
FIG. 8 is a block diagram of a programmable wavelength selective router using tapered fiber gratings in accordance with the invention.

Reconfigurable fiberoptic networks demand wavelength selective optical routers with the ability to dynamically route traffic at particular wavelengths from one fiber path to another and reconfigure the network within 10 ms. In an example of such a router (FIG. 8), two three port circulators 501, 502 are placed along a throughput optical fiber 514, and between the circulators four tapered fiber gratings 508, 509, 510, 511 are arranged in parallel with two 1:2 switches 503, 507 and three 2:2 switches 504, 505, 506. The switches allow any combination of four preselected channels (determined by the Bragg wavelengths of individual tapered fiber gratings) to be routed to the drop port 512 or added from the add port 517. Depending on the switch states, the traffic either passes through the tapered fiber gratings 508, 509, 510, 511 or bypasses it. Any of the four tapered fiber gratings can be made active using this arrangement. This configuration requires that the tapered fiber gratings do not exhibit short wavelength loss over the entire spectral bandwidth transmitted over the throughput fiber. The spectral bandwidth of present WDM systems is typically 35 nm. A similar arrangement using standard fiber gratings would suffer from short wavelength loss due to grating coupling to lossy cladding modes.

EXAMPLE 6

Four Channel Add Filter

Figure 9:
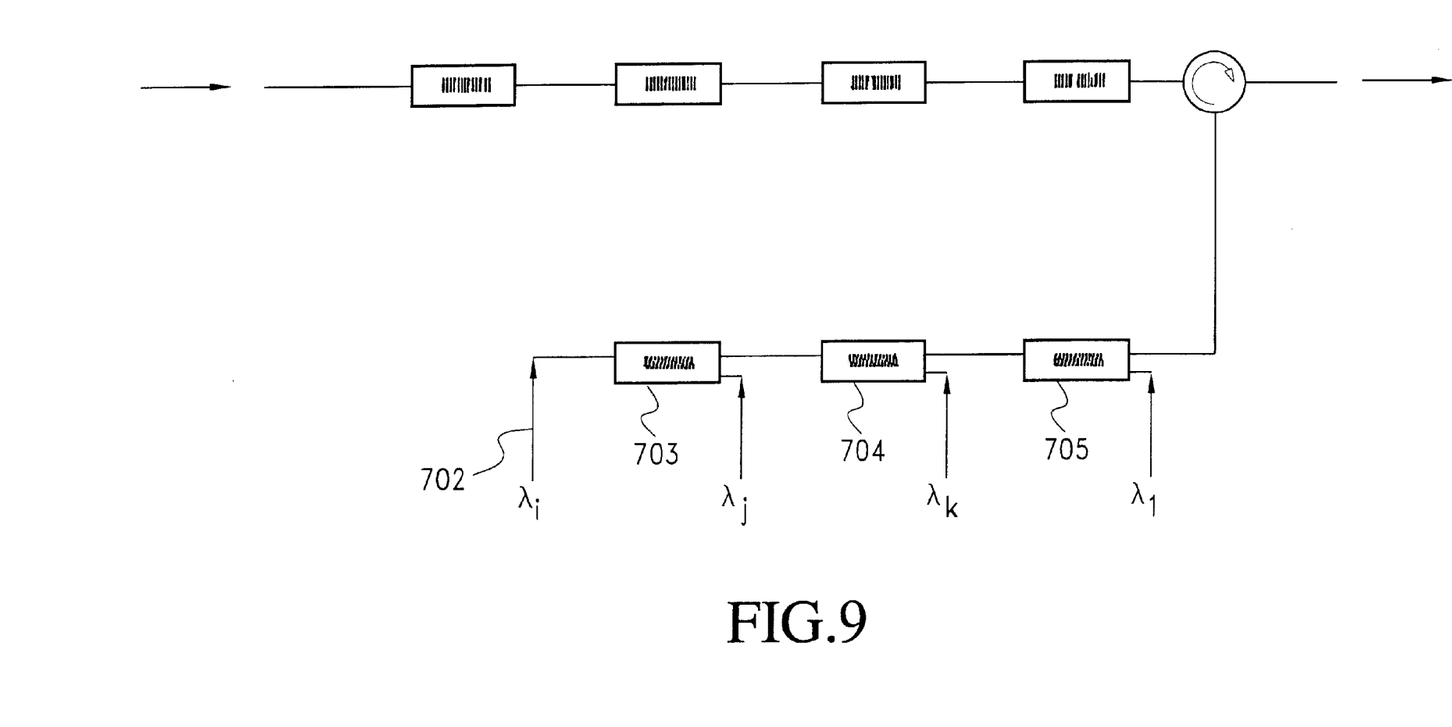
FIG. 9 is a block diagram of a four channel add filter in accordance with the invention.

EXAMPLE 3 can be configured as simply an add filter (FIG. 9). This requires only three grating assisted mode couplers 703, 704, 705 by adding the first channel directly into the throughput of the first grating assisted mode coupler 702.

EXAMPLE 7

Four Channel Drop Filter

Figure 10:
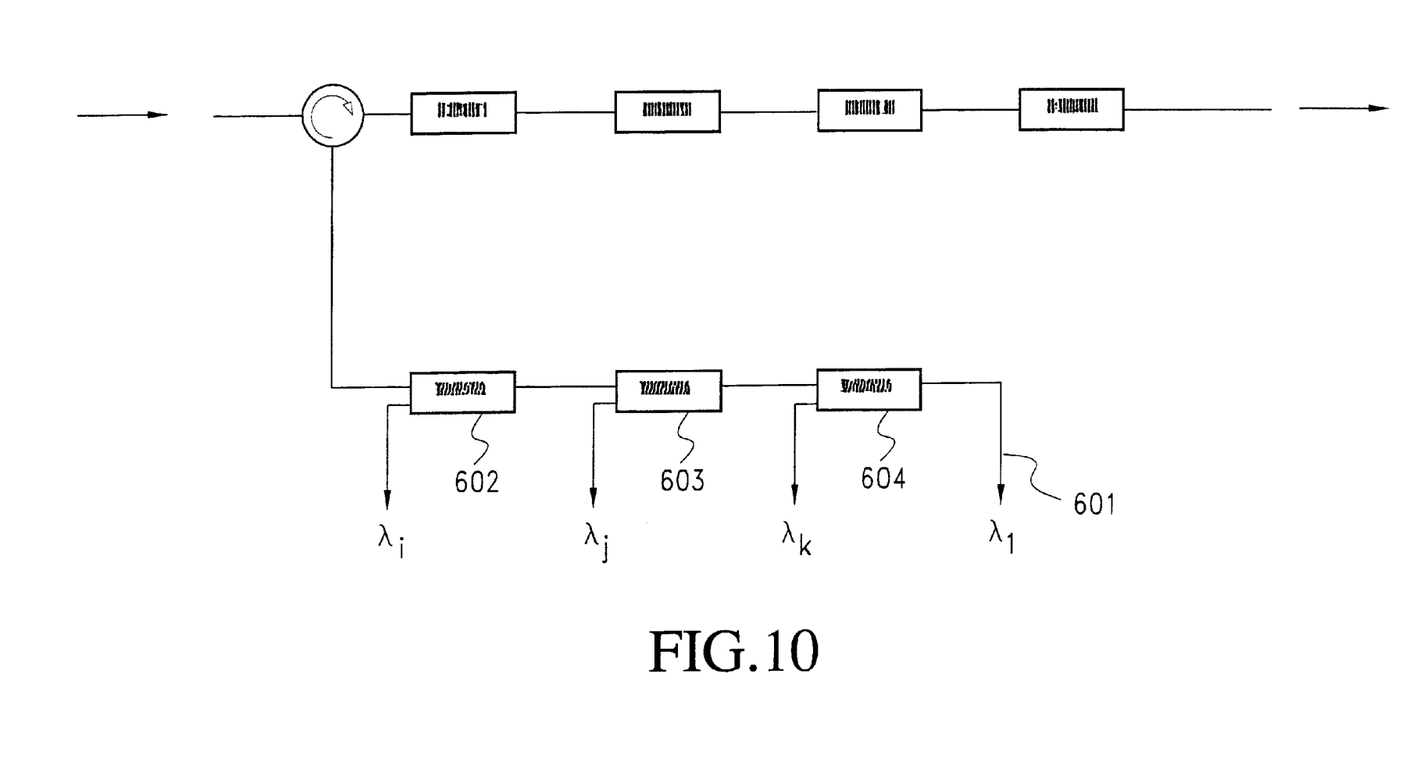
FIG. 10 is a block diagram of a four channel drop filter in accordance with the invention.

EXAMPLE 3 can alternately configured as simply a drop filter (FIG. 10). This requires only three grating assisted mode couplers 602, 603, 604 by directing the last remaining channel on the drop path to drop output four 601.

CONCLUSIONS

It should now be appreciated that the present invention and all of its exemplifications provide a wavelength selective tapered fiber grating displaying a variety of advantages. By fabricating these devices using fused fibers drawn down to extremely narrow coupler waist diameters, the wavelength separation between the backreflected and lossy cladding modes is maximized.

The wavelength selective optical fiber devices disclosed herein have a variety of applications. In one application, a tapered fiber grating with optical circulators is used to add or drop optical signals for communication via a common transmission path. In another application, the tapered fiber grating is used with grating assisted mode couplers and circulators to form an add/drop multiplexer. In another application, these components are used with optical switches to produce programmable add/drop filters and crossconnects.

We claim:

1. An optical waveguide having an interior grating with a periodicity for backreflecting a selected wavelength signal that is within a wavelength band including signals at other wavelengths, comprising:

a tapered waveguide section having a narrow waist region of core and cladding including a doped photosensitive region, the waist region being less than 10 microns in diameter, the waist region including an index of refraction grating of a periodicity chosen for reflecting the selected wavelength, wherein the waist region has a substantially uniform diameter and the cross sectional area of the doped photosensitive region is in excess of 20% of the cross sectional area of the waist region, and wherein the diameter of the waist region is set such that higher order lossy mode reflections are shifted in wavelength below the band of the signals.

2. A waveguide as set forth in claim 1, wherein the splitting between the wavelength of the back reflected signal and the reflected lossy modes is greater than 10 nm.

3. A waveguide as set forth in claim 2, wherein the waist region has a diameter of less than about 4 microns, the diameter varies less than about 0.2 microns, and the waist region includes a dopant distributed over about 50% of the area of the waist region, the grating radial distribution being substantially coextensive with the dopant.

4. A waveguide as set forth in claim 3, wherein the grating in the waist region has a length (L) of approximately 5 mm, the coupling factor $\kappa$ is greater than or equal 4 cm$^{-1}$ and the wavelength of the lossy modes are of the order of 30 nm shorter than the backreflected wavelength.

5. A waveguide as set forth in claim 4, wherein the dopant comprises in excess of 3 mol % germanium, and the waist region is of vitreous silica, the waveguide is single mode at the selected wavelength and the backreflection spectrum has a bandpass of approximately 0.5 nm in the 1550 nm wavelength region.

6. An optical fiber filter comprising:

a length of optical fiber including a core and a photosensitive cladding, said length of optical fiber being tapered to a central region having a length of reduced cross-sectional area in which the cladding is photosensitive through at least about 20% of its cross-sectional area, the central region including an index of refraction grating in the cladding, the period of said grating being chosen to couple a forward propagating mode of said optical fiber into a backwards propagating mode of said optical fiber at a particular wavelength, and the diameter of the central region being chosen to determine the wavelength of back reflections propagated with the backwards propagating mode.

7. An optical fiber filter in accordance with claim 6 above, wherein said index of refraction grating couples said forward propagating mode into one or more orthogonal backwards propagating modes at different wavelengths shorter than said particular wavelength, and wherein the said orthogonal propagating modes are at wavelengths more than 10 nm shorter than the backwards propagating mode at the selected wavelength.

8. An optical device for separation of optical signals by wavelength, comprising:

an optical waveguide including a substantially reduced diameter grating length, the grating length having a substantial radial distribution of photosensitizing dopant extending from its central region, and including a length of periodic index of refraction variations forming a grating of periodicity selected to be reflective at a selected wavelength, the radial distribution of the index of refraction variations extending substantially throughout the dopant distribution, wherein the backreflected wavelength is accompanied by lossy modes at different wavelengths, and the diameter of the central region is selected such that the lossy modes are at wavelengths at least 10 nm shorter than the reflected wavelength.

\* \* \* \* \*